April 24, 1951 P. ORR 2,550,082
ROTARY TURBINE-TYPE HYDRAULIC TORQUE CONVERTER
Filed May 5, 1943 3 Sheets-Sheet 2
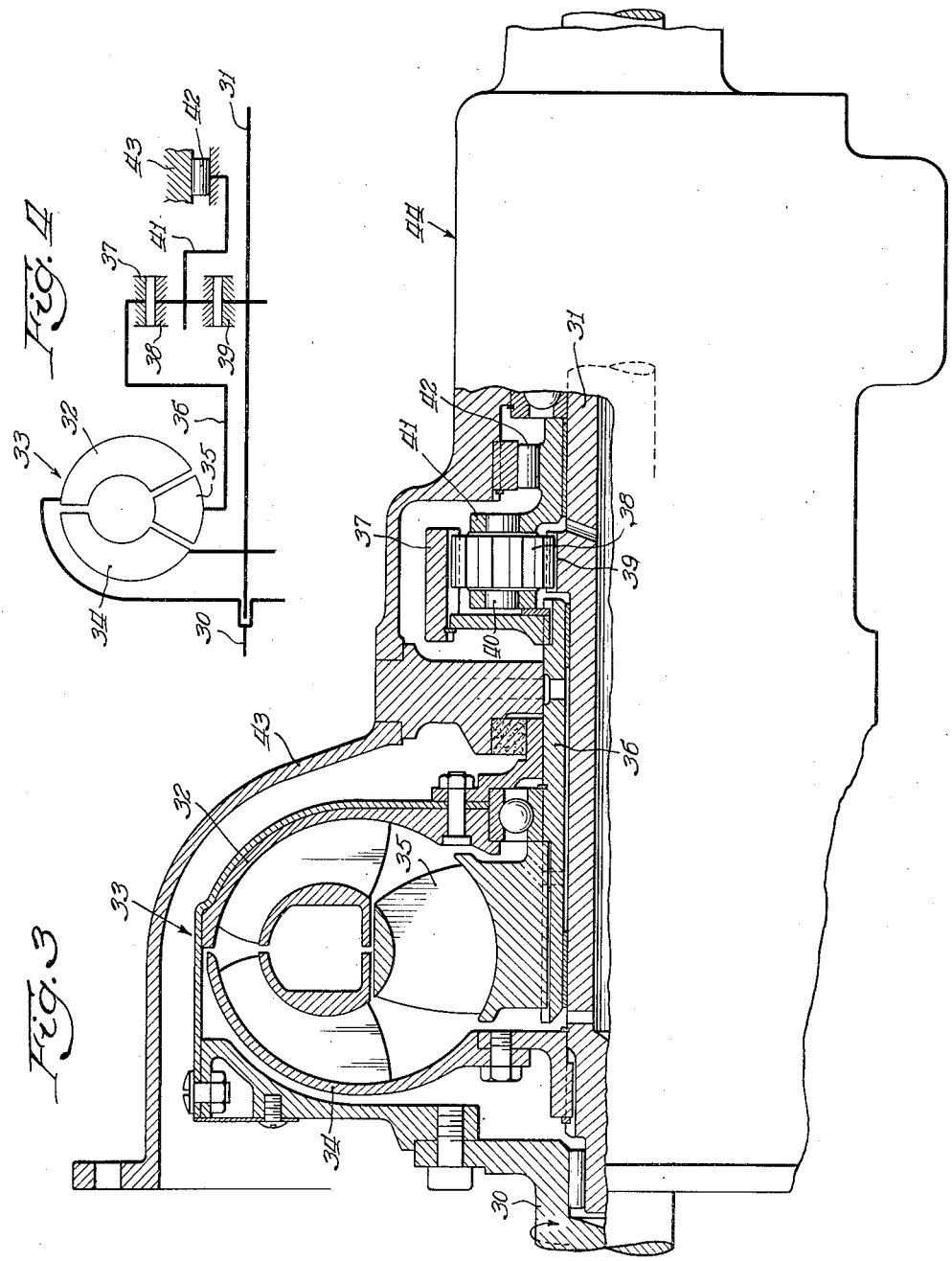
Inventor:
Palmer Orr
By: Edward C. Fitzhugh
Atty.

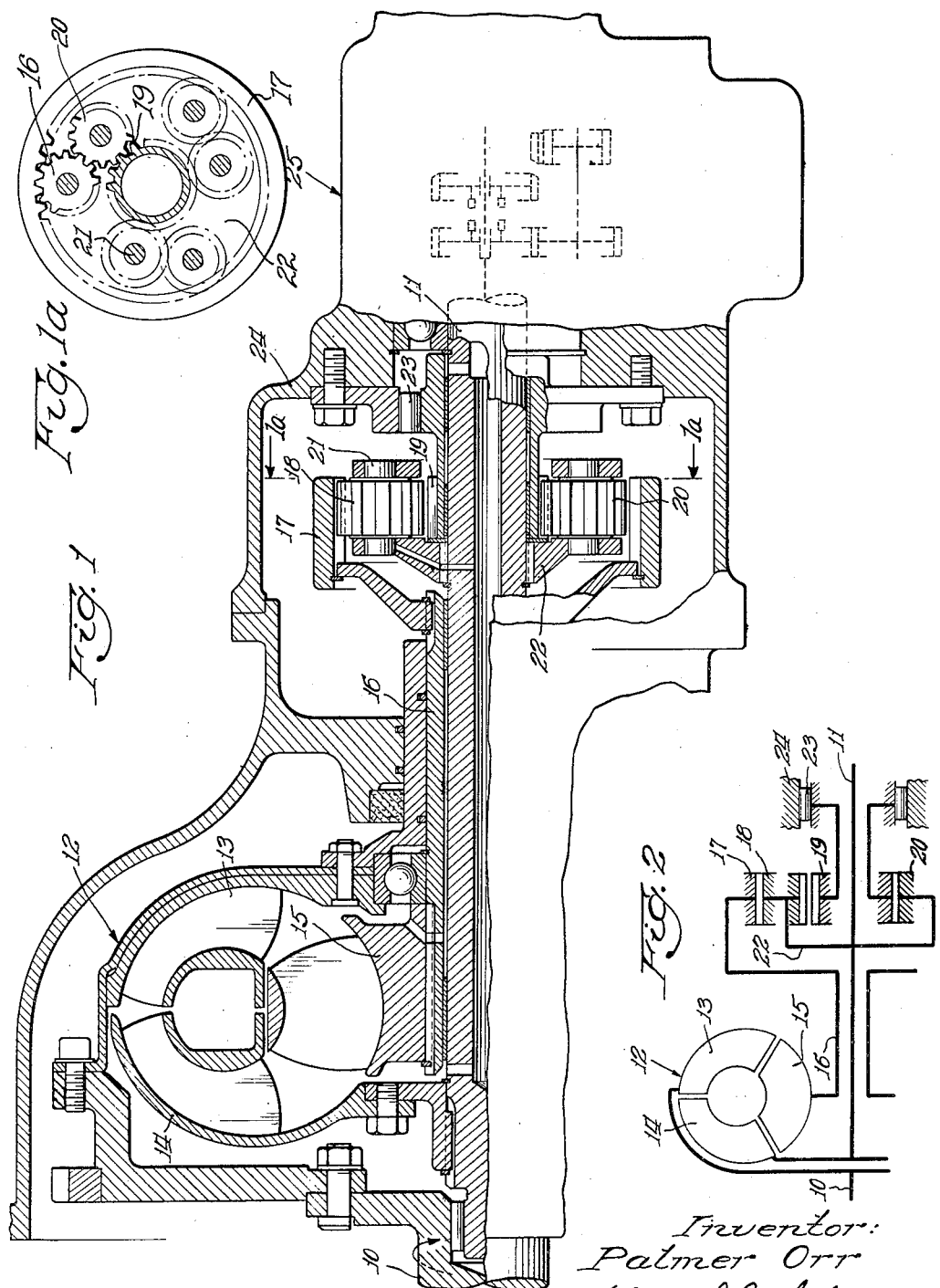

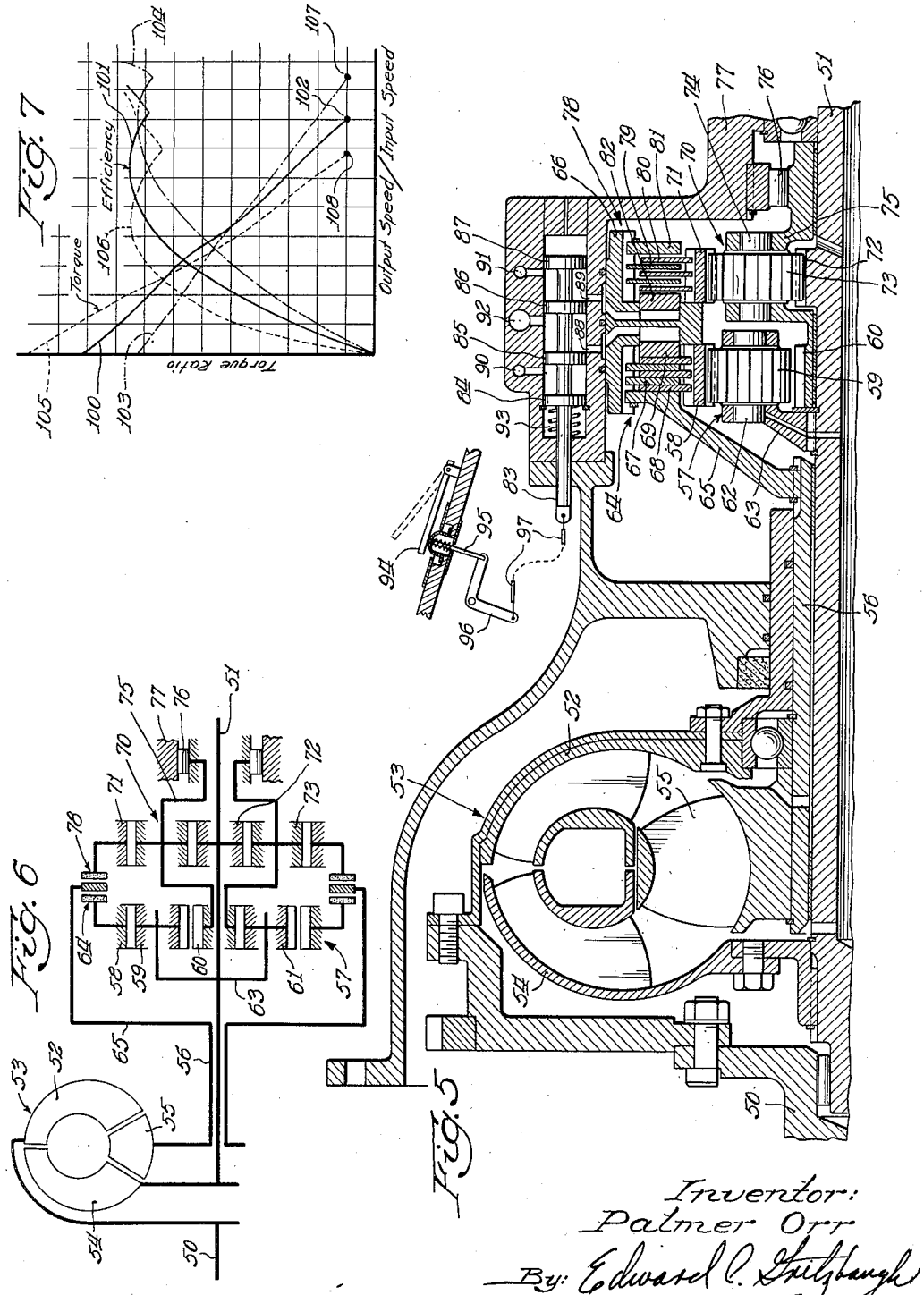

Patented Apr. 24, 1951

2,550,082

UNITED STATES PATENT OFFICE 2,550,082

ROTARY TURBINE-TYPE HYDRAULIC TORQUE CONVERTER

Palmer Orr, Muncie, Ind., assignor to Borg-Warner Corporation, Chicago, Ill., a corporation of Illinois Application May 5, 1943, Serial No. 485,718

18 Claims. (Cl. 60—54)

My invention relates to transmissions and more particularly to transmissions of the type which comprise hydrodynamic torque converters and which are particularly useful in motor driven vehicles.

Hydrodynamic torque converters of a well known type comprise an impeller, a rotor, and a stator or reaction element, with the three elements being so arranged to form a housing for fluid. When the impeller is rotated, the fluid is given kinetic energy and impinges on the rotor to rotate it. The reaction element functions to change the direction of flow of the fluid and is so arranged whereby the rotor is driven at a higher torque than the impeller is driven. It is one of the objects of my invention to provide improved means for rotating the reaction element of a torque converter of this type while the converter is functioning to drive the rotor at a higher torque than is impressed on the impeller whereby to change the characteristics of the converter.

One-way coupling means is preferably provided for the reaction element of a torque converter of the prior art whereby, when the rotor has reached a predetermined speed with respect to the impeller, the reaction element freely rotates in a forward direction along with the impeller and rotor and the converter functions thereafter as a simple two-element fluid coupling. It is another object of my invention to provide, with a torque converter having one-way coupling means allowing such free rotation of the reaction element, improved means for rotating the reaction element while the rotor is being driven at increased torque whereby the "clutch point" of the one-way coupling means, that is, the rotor speed with respect to the impeller speed at which the coupling means for the reaction element releases, is changed from the clutch point which would exist if the reaction element were simply held stationary by the one-way coupling.

It is another object of my invention to provide in a transmission comprising a hydrodynamic torque converter, improved means for rotating the reaction element of the torque converter in the same or forward direction with respect to the impeller of the converter when the rotor is being driven at increased torque.

It is a further object of my invention to provide in a transmission comprising a hydrodynamic torque converter, improved means for rotating the reaction element of the torque converter in the reverse direction when the rotor of the converter is being driven at increased torque.

It is contemplated that the means for rotating the reaction element while the rotor is being driven at increased torque may comprise planetary gearing operatively disposed between the reaction element and the output shaft of the transmission which is driven by the rotor, and it is further contemplated that a one-way brake unit may be associated with the gearing for serving as a one-way braking means for the reaction element of the converter.

It is another object of my invention to provide in a transmission utilizing a hydrodynamic torque converter, two sets of gearing adapted to be selectively made effective for rotating the reaction element either in a forward or in a reverse direction when the rotor of the converter is being driven at increased torque. It is contemplated that friction clutch means may be provided for connecting either of the gear sets operatively between the reaction element and output shaft of the transmission for so rotating the reaction element.

It is still another object of my invention to provide, with one of my improved transmissions including two gear sets for rotating a converter reaction element in either direction and which is installed in a motor vehicle, interconnecting means between the accelerator for the motor vehicle and the clutch means for making the gear sets effective, whereby the gear set operating to rotate the reaction element in a reverse direction is normally effective while the gear set operating to rotate the reaction element in the forward direction is made effective upon the accelerator being moved to its open throttle position. It is contemplated that a one-way brake unit shall preferably be associated with the gear sets whereby the reaction element may rotate freely in the forward direction with the impeller and rotor above predetermined speeds of the rotor.

My invention consists of the novel constructions, arrangements, and devices to be hereinafter described and claimed for carrying out the above-stated objects and such other objects as will appear from the following description of certain preferred embodiments illustrated in the accompanying drawings, wherein:

Fig. 1 is a longitudinal sectional view of a transmission embodying principles of my invention;

Fig. 1a is a sectional view taken on line 1a—1a in Fig. 1.

Fig. 2 is a view showing diagrammatically the transmission illustrated in Fig. 1;

Fig. 3 is a longitudinal sectional view of another transmission embodying principles of my invention;

Fig. 4 is a view showing diagrammatically the transmission illustrated in Fig. 3;

Fig. 5 is a longitudinal sectional view of still another transmission embodying principles of my invention;

Fig. 6 is a view showing diagrammatically the transmission illustrated in Fig. 5; and Fig. 7 is a graph showing the relation between the efficiency, torque and output speed of the transmissions illustrated in the preceding figures.

Like characters of reference designate like parts in the several views.

Referring now to Figs. 1 and 2 of the drawings, the transmission illustrated in these figures comprises an input shaft 10 and an output shaft 11. The transmission may be installed in a motor driven vehicle with the shaft 10 being driven by the engine and the shaft 11 being connected through suitable mechanical connections with the driving wheels of the vehicle. A hydrodynamic torque converter 12 is driven by the shaft 10 and comprises a vaned impeller 13, a vaned rotor 14 and a vaned reaction element 15. The impeller 13 is connected with the input shaft 10; the rotor 14 is splined to the output shaft 11; and the reaction element 15 is splined to a tubular shaft 16 disposed on the shaft 11. The torque converter 12 is of the ordinary type wherein the vanes of the three elements of the converter are disposed in a fluid housing, and the vanes of the elements are so arranged that when the impeller 13 is rotated, the rotor 14 is driven at increased torque with fluid impinging on the reaction element so as to tend to rotate it in a direction reverse with respect to the direction of rotation of the impeller and rotor.

A planetary gear set is operatively disposed between the output shaft 11 and the reaction element 15. This gear set comprises a ring gear 17 connected with the shaft 16, planet gears 18 in mesh with the gear 17, a sun gear 19, and planet gears 20 in mesh with the sun gear and the planet gears 18. The planet gears 18 and 20 are rotatably disposed on stub shafts 21 which are fixed in a carrier element 22 splined on shaft 11. The sun gear 19 is rotatably disposed on the shaft 11, and a one-way roller brake 23, which is of the ordinary type, is provided between a stationary transmission casing 24 and the sun gear. The roller brake 23 is so arranged as to allow the sun gear 19 to rotate freely in the forward direction, that is, in the same direction in which the impeller 13 is rotated, and to prevent rotation of the sun gear 19 in the opposite or reverse direction. A reversing unit 25 of any suitable type may be disposed operatively at the rear of the shaft 11 as shown.

In operation, when the shaft 10 is rotated, power is transmitted from that shaft through the impeller 13 and the rotor 14 to the shaft 11, and the shaft 11 is rotated at a slower speed but at a greater torque than the shaft 10 due to the action of the reaction element 15. The reaction on the reaction element is in the reverse direction; however, as will be explained, the reaction element 15 is rotated by means of the planetary gearing comprising gears 17, 18 and 19 in a forward direction. The shaft 11 rotates in the forward direction whereby the carrier element 22 and planet gears 18 and 20 rotate about the sun gear 19; and the ring gear 17, the shaft 16 and the reaction element 15 are driven in the forward direction and at a slower speed than the impeller 13 or rotor 14. The sun gear 19 functions as the reaction member of the planetary gearing, and the one-way brake 23 is engaged to hold the sun gear 19 against reverse rotation. When the speed of the rotor 14 has increased to a predetermined value, the reaction on the reaction element 15 changes from a force tending to rotate the reaction element in a reverse direction to one tending to rotate it in the forward direction, in accordance with the well-known principles of operation of torque converters of the type shown. When the reaction on the reaction element thus changes, the one-way brake 23 releases and allows the reaction element 15 to rotate freely in the forward direction along with the impeller 13 and rotor 14, and the converter 12 thereafter functions similarly to a simple two-element fluid coupling. When the converter 12 functions to drive the rotor 14 and shaft 11 at increased torque and the reaction on the reaction element 15 is in the reverse direction, the rotation of the reaction element 15 in the forward direction due to the planetary gearing tends to decrease the torque on the rotor and output shaft for any given speed of the impeller 13 with respect to the torque at which the rotor and shaft would be driven if the reaction element 15 were held stationary in accordance with standard practice. Such rotation of the reaction element 15 in the forward direction also tends to increase the output speed of the rotor and output shaft at which the one-way braking means for the reaction element, which in the illustrated transmission is the one-way brake 23, overruns and allows the reaction element to rotate freely in the forward direction.

The transmission illustrated in Figs. 3 and 4 is similar in some respects to the transmission shown in Figs. 1 and 2; however, in the former transmission, the reaction element of a torque converter is rotated in a reverse direction or at a negative speed with respect to the impeller of the converter. The transmission shown in Figs. 3 and 4 comprises an input shaft 30 and an output shaft 31. The shaft 30 is connected with an impeller 32 of a hydrodynamic torque converter 33, and the torque converter comprises in addition to the impeller 32, also a rotor 34 and a stator or reaction element 35. The rotor 34 is splined to the shaft 31, and the reaction element 35 is splined to a shaft 36 disposed on the shaft 31. The torque converter 33 is of the same ordinary type as the converter 12, and the impeller, rotor and reaction element of the converter 33 are similar to the corresponding elements of the converter 12.

A planetary gear set is provided operatively between the reaction element 35 and the shaft 31. The planetary gear set comprises a ring gear 37 connected with the shaft 36, planet gears 38 (one being shown in the drawings) in mesh with the gear 37 and a sun gear 39 formed on the shaft 31 and in mesh with the gears 38. The gears 38 are rotatably disposed on stub shafts 40 which are fixed in a carrier element 41 rotatably disposed on the shaft 31. A one-way roller brake 42 of the well-known type is operatively disposed between the carrier element 41 and a stationary transmission housing 43, and the brake is so arranged as to allow the element 41 to rotate freely in the forward direction or in the same direction as the shaft 30 is rotated and to prevent rotation of the carrier element in the reverse or opposite direction. A reversing unit 44 of any suitable type may be operatively disposed at the rear of the shaft 31 in the same manner as was indicated in Fig. 1.

In the operation of this embodiment of my invention, which is shown in Figs. 3 and 4, when rotation of the shaft 30 is begun, the output shaft 31 is driven at increased torque with respect to the torque applied to the shaft 30 due to the action of the reaction element 35, and the flow of power between the shafts is through the impeller 32 and rotor 34. When the shaft 31 is thus driven at increased torque, the reaction on the reaction element 35 is in the reverse direction, and due to the action of the planetary gear set, the reaction element 35 rotates in the reverse direction as will be explained. The one-way brake 42 is effective to hold the carrier element 41 against reverse rotation, and, since the shaft 31 rotates in the forward direction, the ring gear 37, the shaft 36 and the reaction element 35 rotate in the reverse direction, with the reaction in such direction on the reaction element 35 producing such rotation of these parts. When the speed of the rotor 34 increases sufficiently, the reaction on the reaction element 35 changes to a reaction in the forward direction, and the one-way brake 42 releases and allows the reaction element 35 to rotate freely in the forward direction along with the impeller and the rotor. The effect of allowing the reaction element 35 to rotate in the reverse direction by means of the planetary gear set operatively disposed between the reaction element and the output shaft 31 is to increase the torque at which the shaft 31 is driven when the reaction on the reaction element 35 is in the reverse direction, with respect to the torque which would be applied to the shaft 31 by the converter 33 if the reaction element 35 were held stationary in accordance with standard practice. Such rotation of the reaction element 35 by means of the planetary gear set also has the effect of decreasing the speed of the output shaft 31 at which the one-way clutching means for the reaction element, which in the illustrated transmission is the one-way brake 42, releases to permit the reaction element to rotate freely in the forward direction.

The embodiment of the invention shown in Figs. 5 and 6 includes gear means for rotating the reaction element of a torque converter in both directions. The transmission shown in these figures comprises an input shaft 50 and an output shaft 51. The input shaft 50 is connected with an impeller 52 of a hydrodynamic torque converter 53 which also comprises a rotor 54 and a reaction element 55. The rotor 54 is splined to the shaft 51, and the reaction element 55 is splined to a shaft 56 disposed on the shaft 51. The torque converter 53 is similar to the torque converters 33 and 12 shown in the embodiment of the invention hereinbefore described.

A planetary gear set 57 is provided which is adapted to be connected operatively between the reaction element 55 and the output shaft 51. This gear set comprises a ring gear 58, a plurality of planet gears 59 (one being shown in the drawings) which are in mesh with the ring gear 58, a sun gear 60 rotatably disposed on the shaft 51, and a plurality of planet gears 61 (one being shown in the drawings) which are in mesh with the planet gears 59 and the sun gear. The gears 59 and 61 are rotatably disposed on stub shafts 62 which are fixed in a carrier element 63 splined on the shaft 51.

A friction clutch 64 is provided for operatively connecting the ring gear 58 and the shaft 56. The friction clutch comprises a member 65 which is splined on the shaft 56 and in a member 66, clutch discs 67 splined to the member 66, clutch discs 68 splined to the ring gear 58 and a piston 69 provided in the member 66 and adapted to press the discs 67 and 68 together to engage the clutch 64.

Another planetary gear set 70 is provided for operatively connecting the shaft 51 and the reaction element 55. This gear set comprises a ring gear 71, a sun gear 72 formed on the shaft 51, and a plurality of planet gears 73 which are in mesh with the sun and ring gears. The planet gears 73 are each rotatably disposed on a stub shaft 74 which is fixed in a carrier portion 75 connected with the sun gear 60 and rotatably disposed on the shaft 51. A one-way roller brake 76 is provided between the carrier portion 75 and a stationary transmission housing 77, and the brake 76 is so arranged as to permit free rotation of the carrier portion 75 in a forward direction but to prevent reverse rotation of the carrier portion.

A friction clutch 78 is provided for operatively connecting the ring gear 71 and the shaft 56. The friction clutch comprises clutch discs 79 splined to the member 66, clutch discs 80 splined to the ring gear 71, an annular backing plate 81 fixed in the member 66 and an annular piston 82 slidably disposed in the member 66 for pressing the clutch discs 79 and 80 together.

Fluid pressure means is provided for controlling the clutches 64 and 78. This means comprises a valve piston 83 having four lands 84, 85, 86 and 87 and which is slidably disposed in a cavity provided in the housing 77. Fluid passages 88 and 89 are provided in the housing 77 and member 66 which are in communication with the pistons 69 and 82 and with the cavity in the housing 77, as shown. The housing 77 is also provided with passages 90 and 91 which are in communication with the cavity in the housing and constitute fluid "bleed" passages. A passage 92 which is connected with any suitable source of fluid pressure and with the cavity in the housing is also provided. The valve piston 83 has two principal positions, in one of which it is shown in the figure. In the position of the piston in which it is shown, the piston functions to connect the passages 92 and 88 whereby fluid under pressure is applied to the piston 69 to engage the clutch 64. The piston 83 in this position also functions to connect the passages 89 and 91 whereby any fluid under pressure applied to the piston 82 drains from behind the piston. The piston 83 in its other principal position is moved to the right as seen in Fig. 5 with its land 87 abutting the end of the cavity in the housing 77, and a spring 93 is provided for moving the piston 83 to this position. The piston in this position functions to connect the passages 92 and 89 to apply fluid under pressure to the piston 82 for engaging the clutch 78, and the piston in this position also functions to connect the passages 88 and 90 whereby any fluid under pressure acting on the piston 69 may freely drain from behind the piston for disengaging the clutch 64.

The piston valve 83 may be controlled manually or automatically; for purposes of illustration, however, valve 83 is shown controlled from the accelerator 94 for an engine (not shown) for driving the shaft 50. The means for connecting the accelerator 94 and piston 83 comprises a link 95, a bell crank 96 and a Bowden wire 97, and the means functions such that when the accelerator 94 is in closed throttle position or in other positions intermediate its closed throttle and open throttle positions, the spring 93 acts to hold the piston 83 to the limit of its movement to the right for engaging the clutch 78, and when the accelerator 94 is moved downwardly to its open throttle position, the piston 83 is moved to its position as shown in Fig. 5 due to movement of the link 95 and bell crank 96 for engaging the clutch 64.

It will be observed, particularly from an inspection of Fig. 6, that the planet gear sets 57 and 70 are similar to the planet gear sets shown in Fig. 1 and Fig. 3 embodiments of my invention respectively. When the clutch 64 is engaged and the clutch 78 is disengaged, the gear set 57 is effective, and the reaction element 55 is driven in the forward direction in the same manner that the reaction element 15 is driven in such direction in the Fig. 1 embodiment of the invention. When the clutch 78 is engaged and the clutch 64 is disengaged, the planet gear set 70 is effective, and the reaction element 55 is driven in the reverse direction in the same manner that the reaction element 35 is driven in the reverse direction in the Fig. 3 embodiment of the invention. The one-way brake 76 performs the functions of the one-way brakes 23 and 42, and when either of the clutches 64 or 78 is engaged, the clutch 76 functions to prevent unrestrained reverse rotation of the reaction element 55 whereby the shaft 51 is driven at increased torque and when the speed of the rotor 54 is increased sufficiently, the brake 76 overruns and allows the reaction element 55 to rotate freely in the forward direction along with the impeller 52 and rotor 54. The shaft 51 thus is driven at increased torque in the same manner that the shafts 11 and 31 in the Fig. 1 and Fig. 3 embodiments of the invention are driven, depending on which of the clutches 64 and 78 is engaged.

With the valve piston 83 controlled by means of the accelerator 94 as shown, the clutch 78 is normally engaged and the planet gear set 70 functions to allow the reaction element 55 to rotate in the reverse direction. Due to such rotation of the reaction element 55, the initial torque is higher and the speed of the rotor 54 at which the converter 53 begins to function as a simple fluid coupling is lower than would be the case if the reaction element 55 were stationary. The piston 83 and the connecting linkage between the accelerator 94 and the piston is effective whereby, when the speed of the shaft 51 is quite low and increased torque is desired as manifested by the accelerator 94 being moved to open throttle position, the clutch 64 is engaged to make the planet gear set 57 effective to drive the reaction element 55 in the forward direction, and the converter 53 is effective to drive the shaft 51 at increased torque at a speed at which the converter 53 would function as a simple fluid coupling if no rotation were given to the reaction element 55 or the gearing 70 were functioning to allow reverse rotation of the reaction element. The means interconnecting the piston and accelerator 94 thus acts as means for obtaining increased torque (or down-shifting) below certain speeds of the output shaft 51.

The graph in Fig. 7 shows the ratio of the torque on the output shaft to the torque on the input shaft and the efficiency of the converter and gear combinations hereinbefore disclosed. The curves designated as 100 and 101 designate the torque ratio and efficiency which may be expected from a converter similar to those shown in the embodiments of this invention with simply a one-way brake for the reaction element and without any means for rotating the reaction element when the rotor is being driven at increased torque. The point 102 on the curve 100 designates that point at which the one-way brake would begin to overrun and the converter would begin to act as a simple fluid coupling. The curves 103 and 104 are the torque ratio and efficiency curves of the Fig. 1 embodiment of this invention, and the curves 105 and 106 are the torque ratio and efficiency curves of the Fig. 3 embodiment of the invention. The points 107 and 108 are the points at which the one-way coupling means in the Fig. 1 and Fig. 3 embodiments of the invention begin to overrun, and these points are comparable to the point 102. It will be noted that the Fig. 1 embodiment of the invention provides a lower starting torque and a higher clutch point than a torque converter the reaction element of which is held stationary by a one-way brake while the starting torque of the Fig. 3 embodiment of the invention is higher and the clutch point is lower than the comparable values for the ordinary converter.

I wish it to be understood that I do not intend to limit my invention to the details of construction shown and described except only insofar as certain of the appended claims are specifically so limited, as it will be apparent to those skilled in the art that changes may be made without departing from the principles of the invention.

I claim:

1. In a transmission, the combination of an input shaft, an output shaft, a hydrodynamic torque converter device having an impeller, a rotor and a reaction element, said input shaft being connected to drive said impeller and said output shaft being connected to be driven by said rotor, gear means connected with and disposed effectively between one of said shafts and said reaction element whereby the reaction element is rotated at a geared ratio in a forward direction when said rotor functions to drive the output shaft at increased torque and there is reaction in the reverse direction on the reaction element from the fluid flow in the torque converter device, and a one-way engaging unit so connected with said reaction element and said gear means that it takes a reaction due to any reaction on the reaction element in the reverse direction when the reaction element is so rotated in the forward direction by said gear means and the one-way engaging unit overruns when the reaction on the reaction element changes from the reverse direction to the forward direction while the reaction element is being so rotated at the geared ratio in the forward direction to thereby release the reaction element and allow it to rotate freely in the forward direction.

2. In a transmission, the combination of an input shaft, an output shaft, a hydrodynamic torque converter device having an impeller, a rotor and a reaction element, said impeller being connected with said input shaft and said rotor being connected with said output shaft, planetary gearing connected with and disposed effectively between said reaction element and said output shaft whereby the reaction element is rotated at a geared ratio in the forward direction when the the rotor functions to drive the output shaft at increased torque and there is reaction in the reverse direction on the reaction element from the fluid flow in the torque converter device, and a one-way brake connected with an element of said planetary gearing so that it takes a reaction due to any reaction on the reaction element in the reverse direction when the reaction element is so rotated in the forward direction by said gearing and the one-way brake overruns when the reaction on the reaction element changes from the reverse direction to the forward direction while the reaction element is being so rotated at the geared ratio in the forward direction to thereby release the reaction element and allow it to rotate freely in the forward direction.

3. In a transmission, the combination of an input shaft, an output shaft, a hydrodynamic torque converter device having an impeller, a rotor, and a reaction element, said impeller being connected with said input shaft and said rotor being connected with said output shaft, planetary gear comprising a sun gear, a ring gear, a planet gear in mesh with the ring gear, a planet gear in mesh with said first-named planet gear and with said sun gear, and a planet gear carrier, said ring gear being connected with said reaction element and said planet gear carrier being connected with said output shaft, and a one-way brake for said sun gear adapted to overrun to allow said reaction element to rotate freely in the forward direction.

4. In a transmission, the combination of an input shaft, an output shaft, a torque converter device having a reaction element, an impeller and a rotor, said impeller being driven by said input shaft and said rotor driving said output shaft, and gearing means for selectively causing rotation of said reaction element at either of two different geared relationships with respect to said output shaft when the device functions to drive the output shaft at increased torque and there is reaction in the reverse direction on the reaction element.

5. In a transmission, the combination of an input shaft, an output shaft, a torque converter device comprising an impeller, a rotor, and a reaction element, said impeller being connected with said input shaft and said rotor being connected with said output shaft, two sets of gearing for causing rotation of said reaction element at two different geared relationships with respect to said output shaft when the device functions to drive the output shaft at increased torque and there is reaction in the reverse direction on the reaction element, and means for selectively making operative either of said gear sets.

6. In a transmission, the combination of an input shaft, an output shaft, a torque converter device having an impeller, a rotor and a reaction element, said impeller being driven by said input shaft and said rotor driving said output shaft, and two gear means adapted to be made selectively operative for causing rotation of said reaction element in opposite directions when the device functions to drive the output shaft at increased torque and there is reaction in the reverse direction on the reaction element.

7. In a transmission, the combination of an input shaft, an output shaft, a torque converter device having an impeller, a rotor and a reaction element, said impeller being driven by said input shaft and said rotor driving said output shaft, two gear means adapted to be made selectively operative for causing rotation of said reaction element at two different geared relationships with respect to one of said shafts when the device functions to drive the output shaft at increased torque and there is reaction in the reverse direction on the reaction element, and one-way engaging means for taking a reaction due to reaction on the reaction element in the reverse direction and overrunning when the reaction on the reaction element is in the forward direction.

8. In a transmission, the combination of an input shaft, an output shaft, a torque converter device having an impeller, a rotor and a reaction element, said impeller being driven by said input shaft and said rotor driving said output shaft, two gear means for rotating said reaction element in opposite directions when the device functions to drive the output shaft at increased torque and there is reaction in the reverse direction on the reaction element, clutch means for selectively making effective either of said gear means, and one-way engaging means for taking a reaction due to reaction on the reaction element in the reverse direction and overrunning when the reaction on the reaction element is in the forward direction.

9. In a transmission, the combination of an input shaft, an output shaft, a torque converter device having an impeller, a rotor and a reaction reaction element said impeller being connected with said input shaft and said rotor being connected with said output shaft, two planetary gear sets operatively disposed between said output shaft and said reaction element for rotating said stator in opposite directions when the device functions to drive the output shaft at increased torque and there is reaction in the reverse direction on the reaction element, friction clutch means for selectively making effective either of said gear sets, and one-way engaging means for taking a reaction due to reaction on the reaction element in the reverse direction and overrunning when the reaction on the reaction element is in the forward direction.

10. In a transmission, the combination of an input shaft, an output shaft, a torque converter device comprising an impeller, a rotor, and a reaction element, said impeller being connected with said input shaft and said rotor being connected with said output shaft, a planetary gear set comprising a ring gear, a sun gear, a planet gear in mesh with the sun and ring gears and a planet gear carrier, a friction clutch for connecting said reaction element and said ring gear, said sun gear being connected with said output shaft, a second planetary gear set comprising a ring gear, a planet gear in mesh with said last-named ring gear, a sun gear, a planet gear in mesh with said last-named sun gear and said second-named planet gear, and a carrier for said two last-named planet gears, said last-named carrier being connected with said output shaft and said last-named sun gear being connected with said first-named carrier, a friction clutch for connecting said reaction element and said last-named ring gear, and a one-way brake for said first-named carrier and said last-named sun gear for taking a reaction due to reaction on the reaction element in the reverse direction and overrunning when the reaction on the reaction element is in the forward direction.

11. In a transmission for a motor vehicle, the combination of an input shaft, an output shaft, a torque converter device having an impeller, a rotor and a reaction element, said impeller being driven by said input shaft and said rotor driving said output shaft, gearing means for selectively rotating said reaction element at either of two different geared relationships with respect to said output shaft when the device function to drive the output shaft at increased torque and there is reaction in the reverse direction on the reaction element, an accelerator, and means under the control of said accelerator and controlling said first-named means whereby when the device drives the output shaft at increased torque the reaction element normally rotates at its speed differing greatest from the speed of the impeller and when the accelerator is in open throttle position the reaction element rotates at its other speed.

12. In a transmission for a motor vehicle, the combination of an input shaft, an output shaft, a torque converter device having an impeller, a rotor and a reaction element, said impeller being driven by said input shaft and said rotor driving said output shaft, two gear means adapted to be selectively made operative for rotating said reaction element in opposite directions when the device functions to drive the output shaft at increased torque and there is reaction in the reverse direction on the reaction element, an accelerator having a downshifting position, and means under the control of said accelerator and controlling said gear means whereby when the device drives the output shaft at increased torque the reaction element normally rotates in a reverse direction and when the accelerator is in its downshifting position the reaction element rotates in its forward direction.

13. In a transmission for a motor vehicle, the combination of an input shaft, an output shaft, a torque converter device having an impeller, a rotor and a reaction element, said impeller being driven by said input shaft and said rotor driving said output shaft, two gear sets for rotating said reaction element in opposite directions when the device functions to drive the output shaft at increased torque and there is reaction in the reverse direction on the reaction element, friction clutch means for making effective either of said gear sets, one-way engaging means for taking a reaction due to reaction on the reaction element in the reverse direction and overrunning when the reaction on the reaction element is in the forward direction, an accelerator, and means under the control of said accelerator and controlling said friction clutch means whereby when the device drives the output shaft at increased torque the gear set for driving the reaction element in the reverse direction is normally effective and when the accelerator is in its open throttle position the other gear set is effective.

14. In a transmission for a motor vehicle, the combination of an input shaft, an output shaft, a torque converter device comprising an impeller, a rotor, and a reaction element, said impeller being connected with said input shaft and said rotor being connected with said output shaft, a planetary gear set comprising a ring gear, a sun gear connected with said output shaft, a planet gear in mesh with the sun and ring gears, and a planet gear carrier, a friction clutch for connecting said ring gear and said reaction element, a planetary gear set comprising a ring gear, a sun gear, a planet gear in mesh with said last-named ring gear, a planet gear in mesh with said second-named planet gear and said last-named sun gear, and a carrier for said two last-named planet gears and connected with said output shaft, a friction clutch for connecting said last-named ring gear and said reaction element, said last-named sun gear being connected with said first-named carrier, a one-way brake for said last-named sun gear and first-named carrier for taking a reaction due to reaction on the reaction element in the reverse direction and overrunning when the reaction on the reaction element is in the forward direction, an accelerator, and fluid pressure means under the control of said accelerator and controlling said friction clutches whereby said first-named friction clutch is normally engaged and when the accelerator is in its open throttle position the first-named friction clutch is disengaged and the second-named friction clutch is engaged.

15. In a transmission, the combination of an input shaft, an output shaft, a hydrodynamic torque converter device having an impeller, a rotor and a reaction element, said impeller being driven by said input shaft and said rotor driving said output shaft, two gear means for rotating said reaction element at two different speed ratios with respect to one of said shafts when the device functions to drive the output shaft at increased torque and there is reaction in the reverse direction on the reaction element, fluid pressure responsive means for making each of said gear means operative, a source of fluid pressure, and a valve for connecting said fluid pressure source with one of said fluid pressure responsive means in one position of the valve and for connecting said fluid pressure source with the other of said fluid pressure responsive means in another position of the valve.

16. In a transmission for a motor vehicle, the combination of an input shaft, an output shaft, a hydrodynamic device having an impeller, a rotor and a reaction element for the conversion of torque and having its impeller and rotor connected respectively to said input and output shafts to transmit a drive from said input shaft to said output shaft, a one-way brake for taking the reaction of the reaction element when the hydrodynamic device is converting torque, a pair of gear sets each adapted to be connected between said one-way brake and said reaction element for rotating said reaction element in opposite directions the one of said gear sets rotating said reaction element in a reverse direction providing a high starting torque and the other of said gear sets rotating said reaction element in the forward direction providing a lower starting torque but a longer range of torque multiplication, an accelerator, and means under the control of said accelerator for normally making effective the one of said gear sets for rotating the reaction element in the reverse direction and making said other gear set effective when the accelerator is moved to open throttle position.

17. In a transmission, the combination of an input shaft, an output shaft, a hydrodynamic torque converter device having an impeller, a rotor and a reaction element, said impeller being connected with said input shaft and said rotor being connected with said output shaft, planetary gearing comprising a sun gear, a ring gear, a planet gear in mesh with the ring gear, a planet gear in mesh with said first-named planet gear and with said sun gear, and a planet gear carrier, said ring gear being connected with said reaction element and said planet gear carrier being connected with said output shaft, and means for holding said sun gear against reverse rotation whereby the planetary gearing functions to rotate the reaction element at a geared ratio in the forward direction.

18. In a transmission for an engine driven vehicle, the combination of an accelerator for controlling the speed of the vehicle engine, an input shaft adapted to be rotated in the forward direction by the engine, an output shaft, a hydrodynamic torque converter device having a vaned reaction element, a vaned impeller and a vaned rotor, said impeller being driven by said input shaft and said rotor driving said output shaft, means for driving said reaction element from one of said shafts to rotate relative to each other in a predetermined relationship when the torque converter device functions to drive the output shaft at increased torque and there is reaction in the reverse direction on the reaction element, means for disconnecting the drive from said one shaft to said reaction element, control means including a one-way brake preventing free retrograde movement of said reaction element when the said drive is disconnected and the torque converter device functions to drive the output shaft at increased torque and there is reaction in the reverse direction on the reaction element, and means operatively connecting said accelerator and said disconnecting means to establish said drive to said reaction element at one position of the accelerator and for disconnecting said drive when the accelerator is moved to another position.

PALMER ORR.

REFERENCES CITED

The following references are of record in the file of this patent:

UNITED STATES PATENTS

| Number | Name | Date |
|---|---|---|
| 2,005,444 | Weiss | June 18, 1935 |
| 2,042,189 | Rabe | May 26, 1936 |
| 2,205,794 | Jandasek | June 25, 1940 |
| 2,235,672 | Dodge | Mar. 18, 1941 |
| 2,280,015 | Tipton | Apr. 14, 1942 |
| 2,284,123 | Breer | May 26, 1942 |
| 2,302,714 | Pollard | Nov. 24, 1942 |
| 2,316,390 | Biermann | Apr. 13, 1943 |
| 2,318,660 | Barrett | May 11, 1943 |
| 2,371,337 | Long | Mar. 13, 1945 |

FOREIGN PATENTS

| Number | Country | Date |
|---|---|---|
| 434,707 | Great Britain | of 1935 |